United States Patent
Fukushima et al.

(10) Patent No.: US 10,523,070 B2
(45) Date of Patent: Dec. 31, 2019

(54) ROTOR FOR ROTARY ELECTRIC MACHINE

(71) Applicant: DENSO CORPORATION, Kariya, Aichi-pref. (JP)

(72) Inventors: Akira Fukushima, Kariya (JP); Yuuki Takahashi, Kariya (JP); Makoto Taniguchi, Kariya (JP)

(73) Assignee: DENSO CORPORATION, Kariya (JP)

( * ) Notice: Subject to any disclaimer, the term of this patent is extended or adjusted under 35 U.S.C. 154(b) by 287 days.

(21) Appl. No.: 15/612,344

(22) Filed: Jun. 2, 2017

(65) Prior Publication Data

US 2017/0353066 A1 Dec. 7, 2017

(30) Foreign Application Priority Data

Jun. 3, 2016 (JP) .................. 2016-112267

(51) Int. Cl.
*H02K 1/24* (2006.01)
*H02K 1/28* (2006.01)

(52) U.S. Cl.
CPC ............... *H02K 1/243* (2013.01); *H02K 1/28* (2013.01)

(58) Field of Classification Search
CPC ............................ H02K 1/243; H02K 21/044
USPC ........................................................ 310/263
See application file for complete search history.

(56) References Cited

U.S. PATENT DOCUMENTS

| | | | |
|---|---|---|---|
| 5,955,807 A | 9/1999 | Kajiura et al. | |
| 6,608,424 B2 * | 8/2003 | Kusase | H02K 21/044 310/156.07 |
| 7,834,512 B2 * | 11/2010 | Isogai | H02K 21/044 310/156.66 |
| 2003/0076000 A1 | 4/2003 | Kusase | |
| 2005/0001508 A1 | 1/2005 | Isoda et al. | |
| 2009/0152979 A1 | 6/2009 | Isogai | |
| 2012/0313474 A1 | 12/2012 | Yamamura et al. | |

FOREIGN PATENT DOCUMENTS

| | | | |
|---|---|---|---|
| JP | H11-289731 A | | 10/1999 |
| JP | 11318064 A | * | 11/1999 |
| JP | 2001-231200 A | | 8/2001 |
| JP | 2001-359263 A | | 12/2001 |
| JP | 2001-359264 A | | 12/2001 |
| JP | 2004-088823 A | | 3/2004 |
| JP | 2004-129358 A | | 4/2004 |
| JP | 2009-038907 A | | 2/2009 |
| JP | S51-28594 B2 | | 1/2013 |

* cited by examiner

*Primary Examiner* — Jeremy A Luks
(74) *Attorney, Agent, or Firm* — Oliff PLC

(57) ABSTRACT

In a rotor for a rotary electric machine, a claw pole assembly includes first claw poles and second claw poles. An annular cover member covers the outer circumferential surfaces of the first and second claw poles. The pole cover segments and the inter-pole cover segments are alternately arranged in the circumferential direction of the rotor. Each of the pole cover segments has a circular-arc shape around a first center, and each of the inter-pole cover segments has a circular-arc shape around a second center different from the first center. The first circumferential width of each pole cover segment and the second circumferential width of a corresponding one of the inter-pole segment adjacent to the pole cover segment have a predetermined ratio. The predetermined ratio varies in an axial direction of the rotor.

10 Claims, 8 Drawing Sheets

ROTOR FOR ROTARY ELECTRIC MACHINE

CROSS-REFERENCE TO RELATED APPLICATION

This application is based on and claims the benefit of priority from earlier Japanese Patent Application No. 2016-112267 filed on Jun. 3, 2016, the description of which is incorporated in its entirely herein by reference.

TECHNICAL FIELD

The present disclosure relates to rotors for rotary electric machines.

BACKGROUND OF THE INVENTION

Rotary electric machines, each of which includes a stator and a rotor, are installable in electric motors and power generators for vehicles. Japanese Patent Application Publication No. 2005-027415, referred to as a published patent document, discloses an example of such rotors installed in a rotary electric machine.

The published patent document discloses a Lundell rotor that includes a rotor core and a claw pole assembly protruding along the axial direction of the rotor core from the outer periphery of the rotor core. The claw pole assembly includes first claw poles each with a first magnetic polarity, such as a north polarity, and second claw poles each with a second magnetic polarity, such as a south polarity, different from the first magnetic polarity.

The first claw poles and second claw poles are arranged alternately in the circumferential direction of the rotor core with gaps therebetween. Energizing a field coil wound around the rotor core generates a magnetic field around the field coil. The generated magnetic field magnetizes the first claw poles and second claw poles, so that the first and second poles respectively have different polarities. A rotary electric machine including such a Lundell rotor serves as both a power generator and an electrical motor based on the magnetized first and second poles.

The Lundell rotor disclosed in the published patent document includes a filmy ring member that surrounds the outer circumferential surfaces of the first and second claw poles. Specifically, the filmy ring member encloses the outer circumferential surfaces of the first and second claw poles and the gaps therebetween.

Although the outer circumferential surfaces of the first and second claw poles and the gaps therebetween result in the outer peripheral surface of the claw pole assembly being uneven, the filmy ring member walls the uneven outer circumferential surface of the claw pole assembly. This results in the Lundell rotor having a lower level of wind noise occurring when the Lundell rotor is rotating.

The filmy ring member also binds the first and second claw poles arranged in the circumferential direction of the rotor core. If permanent magnets are disposed in the respective gaps, the filmy ring member prevents the first and second claw poles from being radially deformed when the Lundell rotor is rotating.

SUMMARY

Vibrations of the claw pole assembly of such a Lundell rotor while the Lundell rotor is rotating due to, for example, external magnetic exciting force applied to the Lundell rotor may generate high-frequency noise. If the filmy ring member has a constant curvature, the filmy ring member may be ineffective in reducing the high-frequency noise.

In view of the circumstances set forth above, one aspect of the present disclosure seeks to provide a rotor with a claw pole assembly for rotary electric machines, which is designed to solve the problem set forth above.

Specifically, an alternative aspect of the present disclosure aims to provide such a rotor, which reduces high-frequency noise generated due to vibrations of the claw pole assembly.

According to a first exemplary aspect of the present disclosure, there is provided a rotor for a rotary electric machine. The rotor includes a claw pole assembly including a plurality of first claw poles is and a plurality of second claw poles. The first and second claw poles respectively have first and second magnetic polarities different from each other when magnetized. The first claw poles and the second claw poles are alternately arranged in a circumferential direction of the rotor with gaps therebetween. Each of the first and second claw poles has an outer circumferential surface. The rotor includes a magnetomotive source including at least one of a field winding and a permanent magnet. The magnetomotive source is configured to generate magnetic flux. The rotor includes a guiding member for guiding therethrough the magnetic flux generated by the magnetomotive source to the first and second claw poles. The rotor includes an annular cover member that covers the outer circumferential surfaces of the first and second claw poles. The annular cover member includes a plurality of pole cover segments abutting on the respective outer circumferential surfaces of the first and second claw poles, and a plurality of inter-pole cover segments facing the respective spaces between the first and second claw poles. Each of the pole cover segments has a circular-arc shape around a first center, and each of the inter-pole cover segments has a circular-arc shape around a second center different from the first center. The pole cover segments and the inter-pole cover segments are alternately arranged in the circumferential direction of the rotor. Each of the pole cover segments has a first circumferential width, and each of the inter-pole cover segments has a second circumferential width. The first circumferential width of each pole cover segment and the second circumferential width of a corresponding one of the inter-pole segment adjacent to the pole cover segment have a predetermined ratio. The predetermined ratio varies in an axial direction of the rotor.

This configuration of the rotor enables a temporal waveform of a primary vibration mode originated from the annular cover member to have a non-sinusoidal waveform; the non-sinusoidal waveform is the combination of (1) The waveforms of the primary vibration mode originated from all the pole cover segments (2) The waveforms of the primary vibration mode originated from all the inter-pole cover segments, which are different from the waveforms of the primary vibration mode originated from all the pole cover segments (3) The different waveforms of the primary vibration modes originated from the individual positions of each pole cover segment in the axial direction of the rotor.

This results in the vibration amplitude of each of the first and second claw poles in the primary vibration mode decreasing, thus efficiently reducing vibration noise originated from the first and second claw poles.

Each of the first claw poles of the rotor according to a second exemplary aspect has a base end joined to the guiding means and a tip end opposite to the base end in the axial direction of the rotor. Each of the second claw poles has a base end joined to the guiding means and a tip end opposite to the base end in the axial direction of the rotor. Each of the first claw poles is configured to be gradually tapered from the end to the tip end, and each of the second claw poles is configured to be gradually tapered from the base end to the tip end.

This configuration of the rotor according to the second exemplary aspect enables fluctuations in the magnetic flux generated by the magnetomotive source to be reduced, thus reducing magnetic noise due to the fluctuations in the magnetic flux.

This configuration of the rotor according to the second exemplary aspect also enables the vibration amplitude of the rotor 20 mainly in the circumferential direction of the claw pole assembly to be reduced as compared with both (1) The configuration where the circumferential width of each of the first and second claw poles in the axial direction of the rotor is set to be constant (2) The configuration where the circumferential width of each of the first and second claw poles is tapered from its tip end to its base end.

In the rotor according to a third exemplary aspect, each of the pole cover segments has a first radius of curvature, and each of the inter-pole cover segments has a second radius of curvature. The first radius of curvature of each of the pole cover segments is set to be different from the second radius of curvature of each of the inter-pole cover segments.

This configuration of the rotor according to the third exemplary aspect enables the temporal waveform of the primary vibration mode originated from the annular cover member to be a non-sinusoidal waveform; the non-sinusoidal waveform is comprised of (1) The waveforms of the primary vibration mode originated from all the pole cover segments (2) The waveforms of the primary vibration mode originated from all the inter-pole cover segments, which are different from the waveforms of the primary vibration mode originated from all the pole cover segments (3) The different waveforms of the primary vibration modes originated from the individual positions of each pole cover segment in the axial direction of the rotor.

This results in the vibration amplitude of each of the first and second claw poles in the primary vibration mode decreasing, thus efficiently reducing vibration noise originated from the first and second claw poles.

In the rotor according to a fourth exemplary aspect, the first radius of curvature of each of the pole cover segments is set to be shorter than the second radius of curvature of each of the inter-pole cover segments.

This enables the vibration amplitude of each of the first and second claw poles in the primary vibration mode further decreasing, thus further efficiently reducing vibration noise originated from the first and second claw poles.

The rotor according to a fifth exemplary aspect is configured such that the annular cover member is made of an annular soft magnetic material that has a constant radial thickness over an entire circumference thereof.

This configuration of the rotor according to the fifth exemplary aspect prevents stress concentration at any point on the annular cover member, thus preventing the annular cover member from decreasing in strength due to stress concentration. This configuration of the rotor according to the firth exemplary aspect, which reduces the vibration level of the first and second claw poles, enables the radial thickness of the annular cover member to be reduced as thin as possible on condition that sufficient strength of the rotor against such vibration is maintained.

The annular cover member has a sufficiently thin and constant radial thickness over its entire circumference as described above. This results in the annular cover member being magnetically saturated, so that the magnetic characteristics of the annular cover member become substantially equivalent to the magnetic characteristics of air.

The rotor is configured such that the arrangement of each adjacent pair of first and second claw poles permit a certain amount of magnetic flux to be leaked through the space between the first and second claw poles of each adjacent pair. This results in the space between the first and second claw poles of each adjacent pair being magnetically saturated, thus providing a robust magnetic path across the space between the first and second claw poles of each adjacent pair against magnetic leakage. The rotor of the fifth exemplary aspect therefore achieves improvement of both mechanical strength and magnetic performance thereof.

In the rotor according to a sixth exemplary aspect, the annular cover member includes a plurality of annular soft magnetic thin plates stacked in their axial directions. This enables eddy current loss in the annular cover member in the axial direction of the rotor to be reduced, thus improving the energy efficiency of the rotor.

The rotor according to a seventh exemplary aspect is configured such that the annular cover member is comprised of a coil spirally wound around the claw pole assembly about a center axis of the rotor, and the coil is made of one of a soft magnetic thin platy member and a soft magnetic wire. This configuration enables eddy current loss in the annular cover member in the axial direction of the rotor to be reduced, thus improving the energy efficiency and torque-output efficiency of the rotor.

The rotor according to an eighth exemplary aspect is configured such that the annular cover member is comprised of an annular soft-magnetic mesh member. This configuration enables eddy current loss in the annular cover member in the axial direction of the rotor to be reduced, thus improving the energy efficiency and torque-output efficiency of the rotor. In addition, this configuration efficiently reduces fine vibrations of the first and second claw poles.

In the rotor according to a ninth exemplary aspect, the annular cover member is comprised of an annular soft-magnetic mesh member having mesh holes therein, and magnetic materials filled in the respective mesh holes. This configuration enables eddy current loss in the annular cover member in the axial direction of the rotor to be reduced, thus improving the energy efficiency and to torque-output efficiency of the rotor. In addition, this configuration efficiently reduces fine vibrations of the first and second claw poles, and improves the magnetic performance of the annular cover member.

In the rotor according to a tenth exemplary aspect, the is annular cover member is comprised of an annular porous magnetic member. This configuration enables eddy current loss to be reduced in the annular cover member, and improves its magnetic performance.

In the rotor according to an eleventh exemplary aspect, the annular cover member is comprised of a hollow cylindrical soft-magnetic pipe member higher in electrical resistivity than a soft-magnetic iron. This configuration enables eddy current loss to be reduced in the annular cover member, and satisfies sufficient magnetic performance.

BRIEF DESCRIPTION OF THE DRAWINGS

Other aspects of the present disclosure will become apparent from the following description of embodiments with reference to the accompanying drawings in which.

DETAILED DESCRIPTION OF EMBODIMENT

The following describes an exemplary embodiment of the present disclosure with reference to the accompanying drawings.

Figure 2:
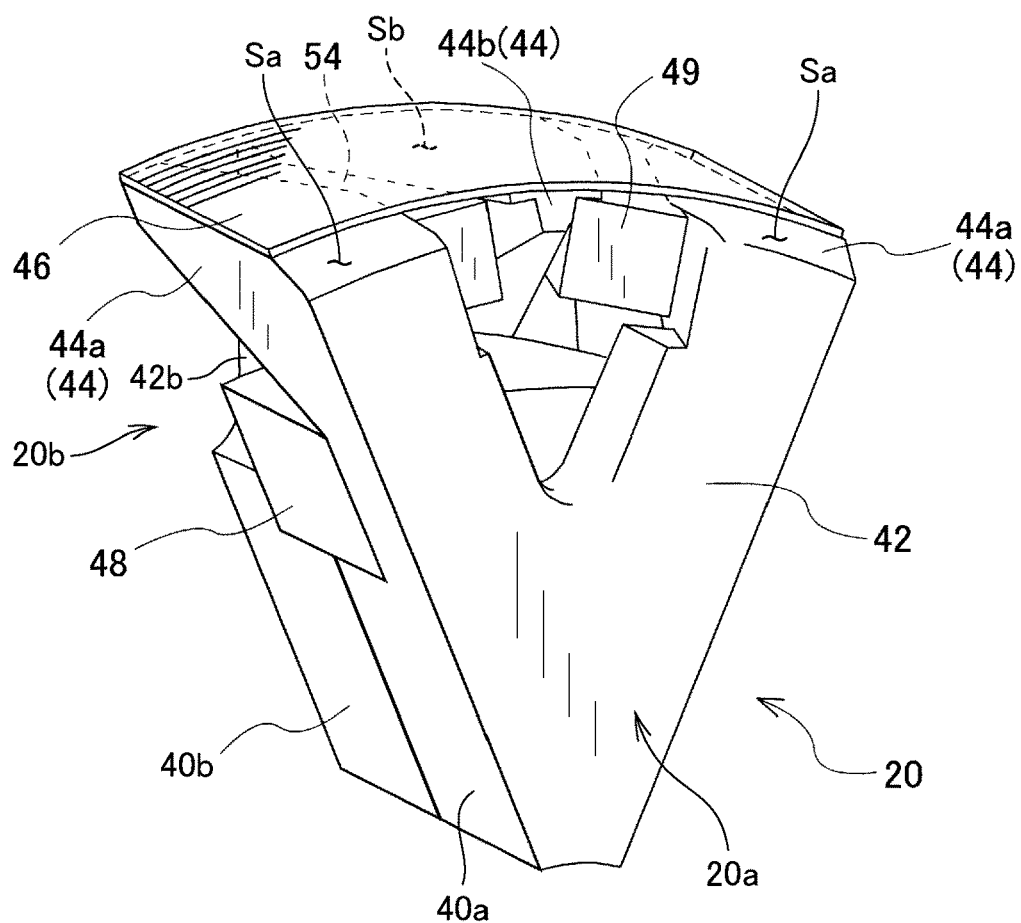
FIG. 2 is an enlarged perspective view of a part of the rotor illustrated in FIG. 1.

The following describes an example of the configuration of a rotary electric machine 22 including a rotor 20 of this embodiment. Note that FIG. 2 is an enlarged perspective view of a part of the rotor 20.

The rotor 20 is installed in the rotary electric machine 22 installable in, for example, a vehicle. The rotary electric machine 22 according to this embodiment is installed in a vehicle.

The rotary electric machine 22 serves as an electrical motor to generate drive power, i.e. torque, based on electrical power supplied from, for example, a direct-current (DC) power source, such as a battery. The rotary electric machine 22 also serves as a power generator to generate electrical power based on drive power, i.e. torque, supplied from an internal combustion engine, referred to simply as an engine. The electrical power charges the power source.

Figure 1:
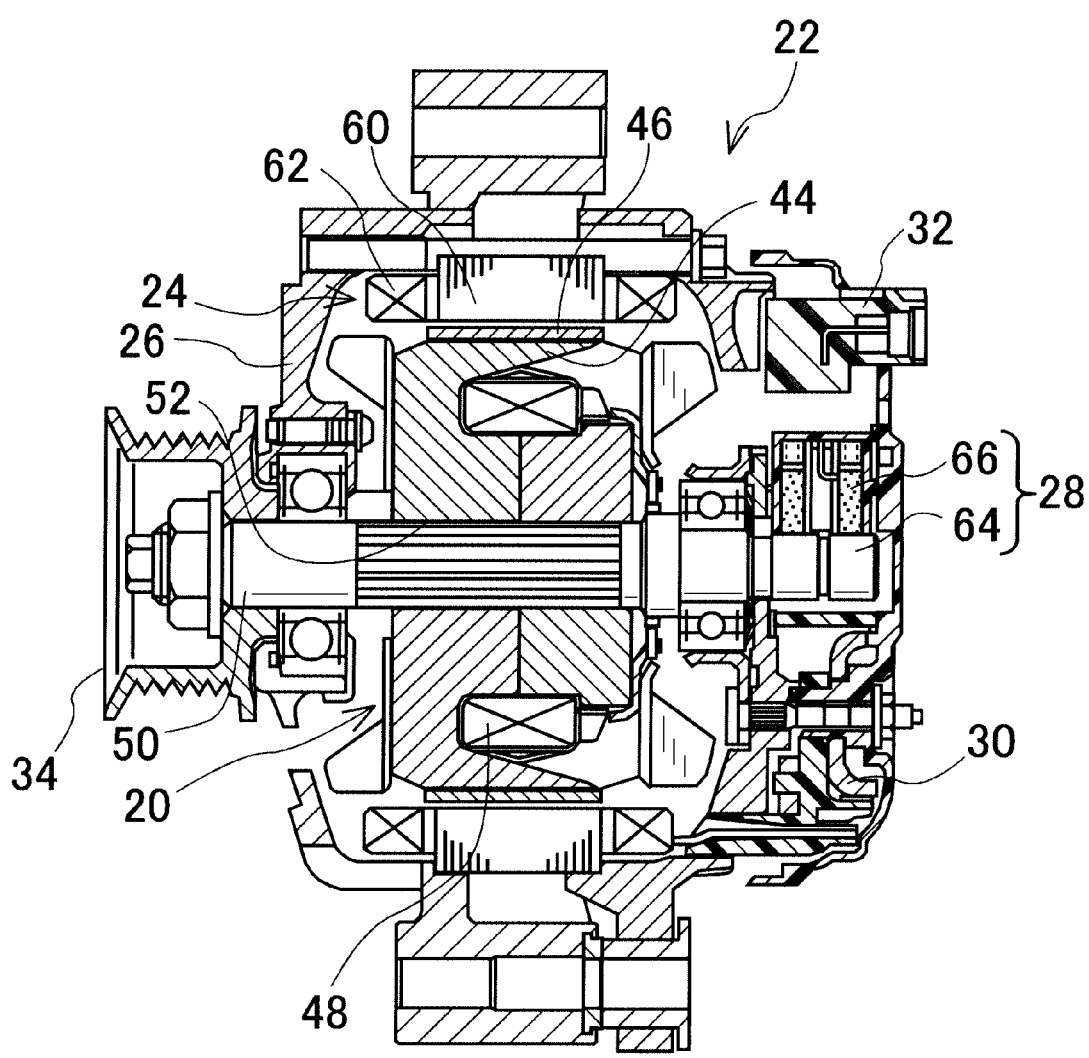
FIG. 1 is a cross-sectional view of a rotating electrical machine including a rotor according to a present embodiment of the present invention.

Specifically, as illustrated in FIG. 1, the rotary electric machine 22 includes the rotor 20, a stator 24, a housing 26, a brush assembly 28, a rectifier 30, a voltage regulator 32, a rotating shaft 50, and a pulley 34.

As partially illustrated in FIG. 2, the rotor 20 includes a first core segment 20a and a second core segment 20b arranged to face each other. The rotor 20 also includes an annular cover member 46, a field coil 48, and permanent magnets 49.

The first core segment 20a includes a hollow cylindrical boss portion 40a having a circular hole at its center, and a plurality of, for example, eight support portions 42a continuously extending radially from the outer circumferential surface of a first end of the tubular boss portion 40a with gaps therebetween. The first core segment 20a also includes a plurality of, for example, eight first claw pole members, referred to simply as first claw poles, 44a continuously extending from the respective radially outermost ends of the support portions 42a toward the second core segment 20b in the axial direction of the circular hole of the hollow cylindrical boss portion 40a.

Similarly, the second core segment 20b includes a hollow cylindrical boss portion 40b having a circular hole at its center, and a plurality of, for example, eight support portions 42b continuously extending radially from the outer circumferential surface of a first end of the tubular boss portion 40b with gaps therebetween. The second core segment 20b also includes a plurality of, for example, eight second claw pole members, referred to simply as second claw poles, 44b continuously extending from the respective radially outermost ends of the support portions 42b toward the first core segment 20a in the axial direction of the circular hole of the hollow cylindrical boss portion 40b.

As illustrated in FIGS. 1 and 2, the first core segment 20a and the second core segment 20b are assembled to each other such that (1) A second end of the hollow cylindrical boss portion 40a, which is opposite to the first end thereof, and a second end of the hollow cylindrical boss portion 40b, which is opposite to the first end thereof, are coaxially joined to each other to define a boss assembly 40 having a shaft hole 52

(2) The first claw poles 44a and the second claw poles 44b are alternately arranged in the circumferential direction of the first and second rotor core segments 20a and 20b with gaps 54, i.e. pole gaps 54, therebetween.

In particular, the direction from the first end of the first claw pole 44a to the second end thereof, which is parallel to the axial direction of the rotor 20, i.e. the rotating shaft 50, is defined as a first axial direction of the rotor 20, and the other direction of the first direction is defined as a second axial direction of the rotor 20.

The rotating shaft 50, which has opposing first and second ends, is mounted in the shaft hole 52 while both the first and second ends penetrate from the shaft hole 52. For example, the first and second ends of the rotating shaft 50 correspond to the respective first to and second axial directions of the rotating shaft 50.

The alternately arranged first and second claw poles 44a and 44b in the circumferential direction of the rotor 20 constitute a claw pole assembly 44. That is, the boss assembly 40, the support portions 42a and 42b, and the claw pole assembly 44 constitute a pole core of the rotor 20.

The first and second claw poles 44a and 44b respectively have outer circumferential end surfaces Sa and Sb. Each of the outer circumferential end surfaces Sa and Sb of the first and second claw poles 44a and 44b has a circular-arc shape around a point on the axial center Of the rotating shaft 50 or thereabout. The point is defined such that a line connecting between the point on the center axis of the rotating shaft 50 and the center of each of the outer circumferential end surfaces Sa and Sb of the first and second claw poles 44a and 44b is perpendicular to the center axis of the rotating shaft 50. The point on the center axis of the rotating shaft 50 will be referred to as an axial center O of the rotating shaft 50 (see FIG. 4).

More specifically, each of the outer circumferential end surfaces Sa and Sb of the first and second claw poles 44a and 44b has a circular-arc shape around the axial center O of the rotating shaft 50 or around a portion of the rotating shaft 50; the portion is disposed to be slightly closer to the claw pole assembly 44 than the axial center O of the rotating shaft 50 thereto. For example, each of the outer circumferential end surfaces Sa and Sb of the first and second claw poles 44a and 44b has a radius R1 of curvature that is equal to or shorter than the radius of curvature R of a reference circular arc. The reference circular arc has a radius defined by the line segment between each of the radially outermost parts of the respective outer circumferential end surfaces Sa and Sb and the axial center O of the rotating shaft 50. In other words, the reference circular arc passes through the radially outermost parts of the respective outer circumferential end surfaces Sa and Sb.

The outer circumferential end surfaces Sa and Sb of the first and second claw poles 44a and 44b constitute a virtually outer circumferential surface of the claw pole assembly 44.

The first claw poles 44a have a north polarity, and the second claw poles 44b have a south polarity, which is different from the north polarity.

Each of the first claw poles 44a projects from the radially outermost end of the corresponding support portion 42a in the first axial direction of the rotor 20, and each of the second claw poles 44b projects from the radially outermost end of the corresponding support portion 42b in the second axial direction of the rotor 20.

The first claw poles 44a and second claw poles 44b have the same shape except for their locations and projecting directions.

Each of the first and second claw poles 44a and 44b has a predetermined width, i.e. a predetermined circumferential width, in the circumferential direction of the rotor 20, in other words, each of the outer circumferential end surfaces Sa and Sb has a predetermined circumferential width. Each of the first and second claw poles 44a and 44b also has a predetermined thickness, i.e. a predetermined radial thickness, in the corresponding radial direction of the rotor 20, in other words, each of the outer circumferential end surfaces Sa and Sb has a predetermined radial thickness.

Specifically, each of the first claw poles 44a is configured such that the corresponding circumferential width and the corresponding radial thickness are gradually tapered in the first axial direction of the rotating shaft 50. Similarly, each of the second claw poles 44b is configured such that the corresponding circumferential width and the corresponding radial thickness are gradually tapered in the second axial direction of the rotating shaft 50. That is, the rotor 20 is designed as a Lundell rotor.

In other words, if each of the first and second claw poles 44a and 44b has a base end continuing from the corresponding radially outermost end of the corresponding support portion, and a tip end opposite to the base end, the circumferential width and the radial thickness of each of the first and second claw poles 44a and 44b are tapered from the base end to the tip end.

Figure 6:
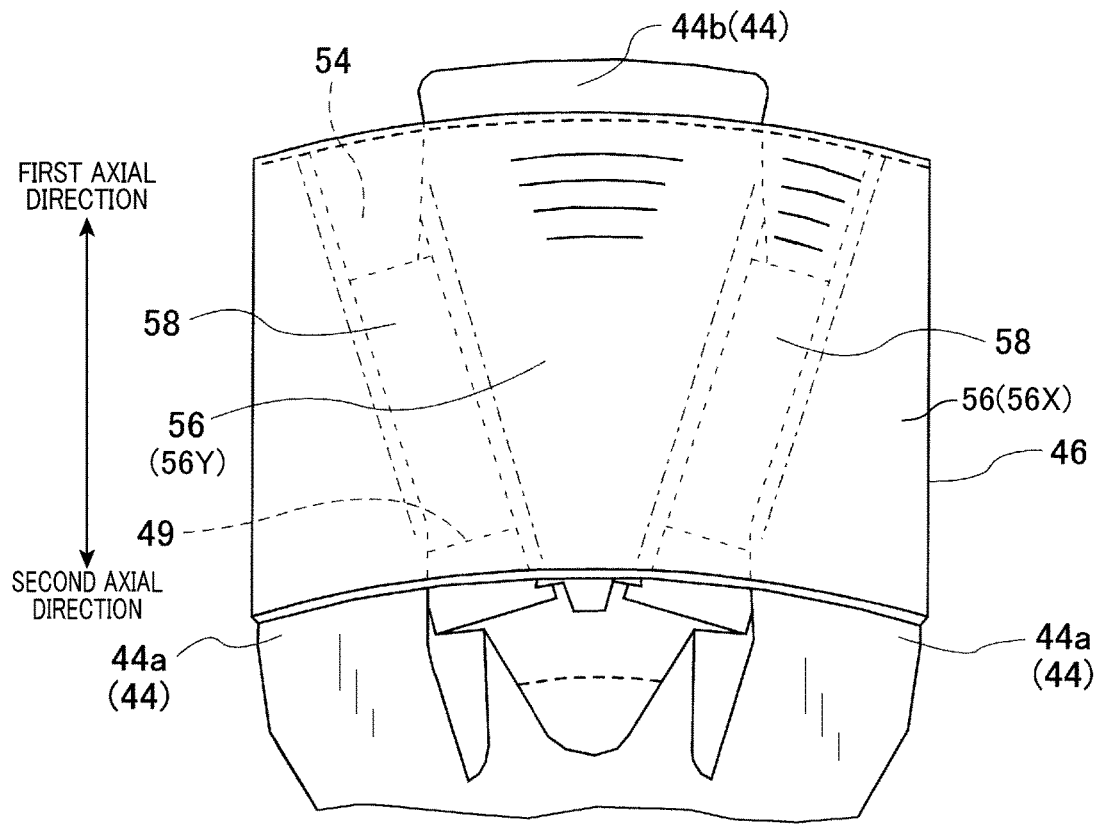
FIG. 6 is an enlarged perspective view schematically illustrating the relationship between the shape of a second claw pole and the shape of a pole cover segment facing the second claw pole.

That is, as illustrated in FIG. 6, each of the outer circumferential end surfaces Sa and Sb has, for example, a substantially isosceles trapezoid shape when viewed from the radial outside of the rotor 20.

The gaps 54 are defined between the respective adjacent pairs of the first and second claw poles 44a and 44b. The gaps 54 have the same shape.

As illustrated in FIG. 6 for example, each gap 54 has a substantially constant circumferential width along the axial direction of the rotor 20. Alternately, the gaps 54 are configured such that the differences between the circumferential widths of the respective gaps 54 along the axial direction of the rotor 20 are maintained within a very small-length range. In other words, the first and second claw poles 44a and 44b are configured such that their circumferential gaps 54 each have (1) A substantially constant circumferential width along the axial direction of the rotor 20

(2) A substantially identical shape.

The annular cover member 46, which is an example of tubular covers or tubular surroundings, is disposed on or over the virtually outer circumferential surface of the claw pole assembly 44, i.e. disposed on or over the outer circumferential end surfaces Sa and Sb of the first and second claw poles 44a and 44b. This covers the virtually outer circumferential surface of the claw pole assembly 44, i.e., the outer circumferential end surfaces Sa and Sb of the first and second claw poles 44a and 44b. The annular cover member 46 has a constant radial thickness over its entire circumference. This radial thickness is set to a value that lies for example within the range from 0.6 to 1.0 mm; the value of the radial thickness enables the mechanical strength and magnetic performance of the rotor 20 to be compatible with each other. The annular cover member 46 is, for example, fixedly mounted to the outer circumferential end surfaces Sa and Sb of the first and second claw poles 44a and 44b using shrink fitting, press fitting, welding, or combination of these processes.

The annular cover member 46 is made of, for example, a soft magnetic material, such as an electrical steel sheet made of iron and silicon steel. Specifically, the annular cover member 46 includes a plurality of soft magnetic annular thin plates, such as, electrical steel sheets, stacked in their axial directions. Each thin plate has a certain thickness. Note that the annular cover member 46, which is comprised of the stack of the annular thin plates, can be preferably configured such that adjacent soft magnetic thin plates are insulated from each other to suppress eddy current losses.

Figure 3:
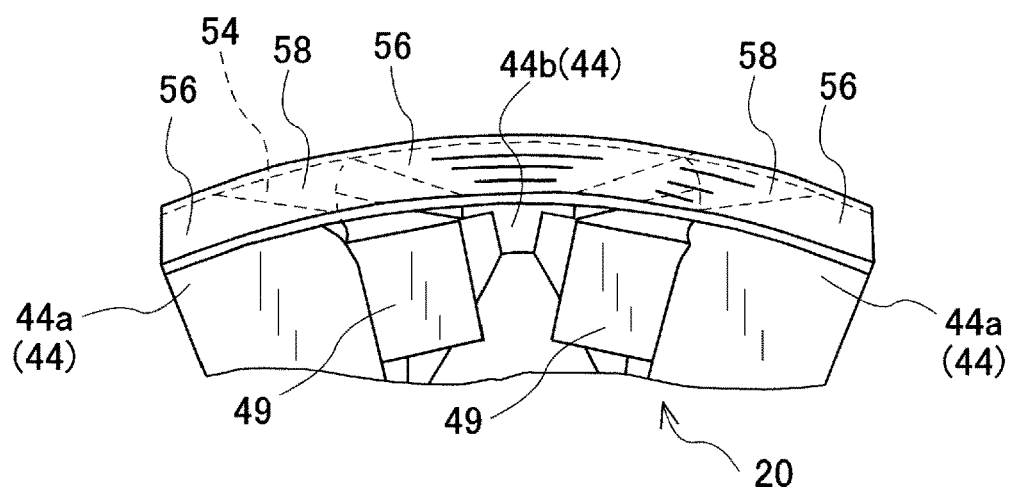
FIG. 3 is an enlarged perspective view of a part of the rotor illustrated in FIG. 1 when viewed from the axial outside of the rotor.

As shown in FIG. 3, the annular cover member 46 is comprised of pole cover segments 56 and inter-pole cover segments 58. The pole cover segments 56 face the corresponding first and second claw poles 44a and 44b, and the inter-pole cover segments 58 face the corresponding pole gaps 54. The pole cover segments 56 and inter-pole cover segments 58 are alternately arranged while they are continued in the circumferential direction of the rotor 20. That is, each of the pole cover segments 56 of the annular cover member 46 abuts on the outer circumferential end surface Sa or Sb of the corresponding one of the first and second claw poles 44a and 44b. In contrast, each of the inter-pole cover portions, i.e. pole-gap cover segments 58 closes the corresponding one of the pole gaps 54.

The shape of each of the pole cover segments 56 and pole-gap cover segments 58 will be described in detail later.

The field coil 48, which is an example of coil members, is placed between the boss assembly 40 and the claw pole assembly 44, and generates magnetic flux when a direct current is supplied thereto. The field coil 48 is wound around the outer circumferential surface of the boss assembly 40 about the axial direction of the rotating shaft 50. The magnetic flux generated by the field coil 48 is guided to the claw pole assembly 44 via the boss assembly 44 and the support portions 42. In other words, the boss assembly 44 and the support portions 42 serve as a magnet path that guides the magnetic flux generated by the field coil 48 to the claw pole assembly 44. That is, the field coil 48 has a function of magnetizing the first claw poles 44a to north-poles (N-poles), and magnetizing the second claw poles 44b to south-poles (S-poles) by the generated magnetic flux.

The permanent magnets 49, which are an example of inter-pole magnets, are disposed inside the annular cover member 46. Specifically, the permanent magnets 49 are disposed in the respective pole gaps 54 between the first and second claw poles 44a and 44b.

For example, each of the permanent magnets 49 are supported to the corresponding adjacent pair of first and second claw poles 44a and 44b with predetermined supports (not shown). The permanent magnets 49 are arranged such that centrifugal force, which is generated by rotation of the rotor 20 so as to act on the permanent magnets 49, is applied to the respective first and second claw poles 44a and 44b via the corresponding supports. The permanent magnets 49 have, for example, a function of enhancing the strength of the magnetic flux between the claw pole assembly 44 of the rotor 20 and a stator core of the stator 24 described later. The magnetic flux of the permanent magnets 49 is guided to the claw pole assembly 44.

For example, each of the permanent magnets 49 is arranged such that its magnetic pole is directed to reduce leakage magnetic flux between the corresponding one adjacent pair of the first and second claw poles 44a and 44b.

In particular, each permanent magnet 49 is designed as a plate-like magnet having a first surface with an N-pole, and a second surface, which is opposite to the first surface, with an S-pole. Each permanent magnet 49 is arranged in the corresponding pole gap 54 while the first surface, i.e. an N-pole surface, faces the corresponding first claw pole 44a and the second surface, i.e. an S-pole surface, faces the corresponding second claw pole 44b. That is, each permanent magnet 49 disposed between the corresponding adjacent pair of first and second claw poles 44a and 44b increases the N-pole magnetic field generated by the first claw pole 44a of the corresponding adjacent pair and the S-pole magnetic field generated by the second claw pole 44b of the corresponding adjacent pair.

For example, each of the permanent magnet 40, which has inherently or previously been magnetized to have the N-pole surface and the S-pole surface to thereby provide magneto-motive force, i.e. magnetic flux, in the circumferential direction of the rotor 20, can be disposed in the corresponding pole gap 54 of the rotor 20. Alternately, each of plate-like magnetic members can be disposed in the corresponding pole gap 54 of the rotor 20, and thereafter, can be magnetized to become a permanent magnet.

The stator 24 includes a tubular, i.e. an annular, stator core 60 set forth above, and a stator coil assembly 62. The stator core 60, which is an example of a hollow cylindrical members, has an inner circumferential surface disposed to face the annular cover member 46 of the rotor 20 with an air gap between the inner circumferential surface and the annular cover member 46. That is, the annular cover member 46 of the rotor 20 serves as an outer circumferential surface of the rotor 20.

The stator core 60 includes slots formed therethrough and along the axial direction thereof, and teeth each formed between the corresponding adjacent pair of slots. The stator coil assembly 62 is comprised of three-phase stator coils as an example of multiphase stator coils; each three-phase coils has liner portions. The straight portions of each of the three-phase stator coils are fitted in corresponding ones of the slots, so that the three-phase stator coils are wound around the corresponding teeth.

The stator 24 is operative to induce electromotive force based on a rotating magnetic field generated by rotation of the rotor 20, and to induce a rotating magnetic field when the three-phase stator coils of the stator coil assembly 62 are energized. The stator core 60 of the stator 24 serves as a magnetic path for the generated magnetic fields.

The rotor 20 is operative to generate the rotating magnetic field when rotating, and to rotate based on the rotating magnetic field induced by the stator 24. The pole core of the rotor 20 serves as a magnetic path for the generated magnetic fields.

The housing 26, which is designed as an example of casings, houses the stator 24 and the rotor 20. The housing 26 also rotatably supports the rotating shaft 50, which is fitted in the shaft hole 52, together with the rotor 20. The housing 26 also fixedly supports the stator 24 therein.

The brush assembly 28 includes slip rings 64, brushes 66, and a brush holder 68. The slip rings 66, each of which serves as, for example, an electrical connector, are coaxially mounted on the second end of the rotating shaft 50.

The brush holder 68 is mounted to the inner surface an end portion of the housing 26; the end portion is closer to the second end of the rotating shaft 50 than to the first end of the rotating shaft 50.

The brush holder 68 has a through hole through which the second end of the rotating shaft 50 passes while the slip rings 64 are disposed in the brush holder 68. The brushes 66 installed in the brush holder 68 are pressed to contact with the respective slip rings 66. The slip rings 66 are connected to the field coil 48.

The brushes 66 are connected to the voltage regulator 32. The brushes 66 serves to transfer an electrical current, referred to as a field current, supplied from the voltage regulator 32 to the field winding 48 via the respective slip rings 66.

The rectifier 30 is electrically connected to the three-phase stator coils of the stator coil assembly 62 of the stator 24. The rectifier 30 rectifies an alternative current generated in the stator coil assembly 62 to a direct current as its output.

The voltage regulator 32 controls the field current, which is supplied from the DC power source, to be supplied to the field coil 48 to thereby regulate an output voltage of the rotary electric machine 22 when the rotary electric machine 22 serves as a power generator. The voltage regulator 32 has a function of maintaining the output voltage of the rotary electric machine 22 to a substantially constant level independently of changes of the electric loads for the rotary electric machine 22 and/or the output power generated by the rotary electric machine 22.

A pulley 34 is fixedly mounted to the first end of the rotating shaft 50, which projects from the housing 26. The pulley 34 is linked to a crankshaft of the internal combustion engine, simply as an engine, via a belt or the like. This configuration enables (1) Torque based on the crankshaft of the engine to be transferred to the rotating shaft 50 and the rotor 20 therethrough (2) Torque of the rotating shaft 50 and rotor 20 to be transferred to the crankshaft of the engine as rotary power so that the crankshaft is rotated by the rotary power.

Specifically, the following describes the rotary electric machine 22 operating in a motor mode.

When a direct current is supplied from the DC power source, the direct current is regulated by the power source via the voltage regulator 32, and the regulated direct current is supplied to the field coil 48 via the brush assembly 28. This results in a magnetic flux being induced from the field coil 48. The magnetic flux is transferred through the boss assembly 40, the support portions 42, and the first and second claw poles 44a and 44b, so that the first and second claw poles 44a and 44b are magnetized to the respective N- and S-poles.

While the first and second claw poles 44a and 44b are magnetized to the respective N- and S-poles, the direct current supplied from the DC power source is converted into three-phase alternate currents by an inverter (not shown), and the three-phase alternate currents are supplied to the respective three-phase stator coils of the stator coil assembly 62. This causes the three-phase stator coils to induce a rotating magnetic field. Magnetic interactions between the N- and S-poles of the rotor 20 and the rotating magnetic field induced by three-phase stator coils results in the rotor 20 rotating together with the rotating shaft 50. That is, the rotary electric machine 22 serves as an electric motor that provides torque based on power supplied to the stator coil assembly 62.

Next, the following describes the rotary electric machine 22 operating in a power generator mode.

When the rotor 20 is rotated together with the rotating shaft 50 based on torque transferred from the engine via the pulley 34, rotation of the rotor 20 induces three-phase AC power in the three-phase stator coils of the stator coil assembly 62. The three-phase AC power is converted into DC power by the rectifier 30, and the DC power is supplied to the DC power source so as to be charged in the DC power source.

Next, the following describes in detail the configuration of the annular cover member 46 according to this embodiment.

The rotor 20 according to this embodiment includes the annular cover member 46 that covers the outer circumferential end surfaces Sa and Sb of the first and second claw poles 44a and 44b. The annular cover member 46, which serves as a hollow cylindrical cover, includes the pole cover segments 56 and the inter-pole cover segments 58. The pole cover segments 56 and the inter-pole cover segments 58 are alternately joined to each other to constitute the annular cover member 46.

Figure 5:
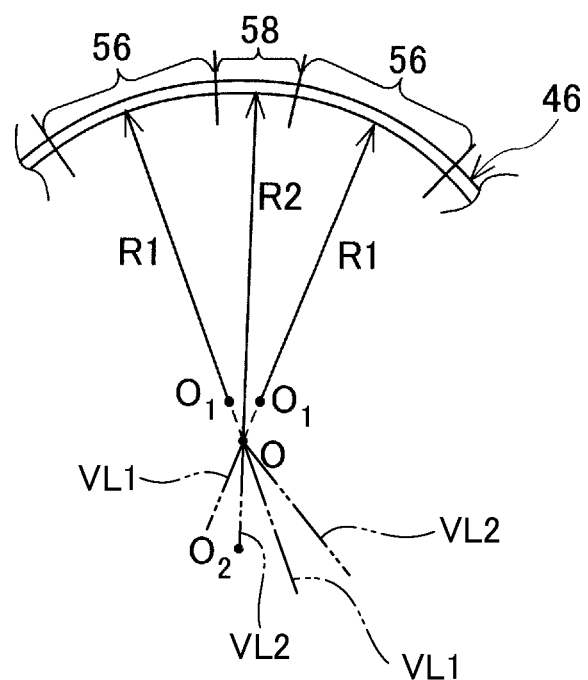
FIG. 5 is a view schematically illustrating a radius of curvature of each of pole cover segments of an annular cover member illustrated in FIG. 2, and a radius of curvature of each of inter-pole cover segments of the annular cover member.

Referring to FIG. 5, the pole cover segments 56 have inner and outer cover surfaces 56a and 56b opposite to each other. The inner cover surfaces 56a of the pole cover segments 56 contact with, i.e. abut on, the outer circumferential end surfaces Sa and Sb of the first and second claw poles 44a and 44b. The inter-pole cover segments 58 have inner and outer cover surfaces 58a and 58b opposite to each other. The inner cover surfaces 58a of the inter-pole cover segments 58 face the respective pole gaps 54 to close the respective pole gaps 54.

The pole cover segments 56 and the inter-pole cover segments 58 are designed as respective circular arc segments having different centers. The pole cover segments 56 and the inter-pole cover segments 58, which respectively have the different centers, are alternately joined to each other in the circumferential direction of the rotating shaft 50 around the axial center O of the rotating shaft 50. In other words, the inner cover surfaces 56a of the pole cover segments 56 and the inner cover surfaces 58a of the inter-pole cover segments 58, which respectively have the different centers, are alternately joined to each other in the circumferential direction of the rotating shaft 50 around the axial center O of the rotating shaft 50, resulting in an annular inner cover surface of the annular cover member 46 to be achieved.

Each of the pole cover segments 56 has a predetermined constant curvature matching with the curvature of the corresponding one of the outer circumferential end surfaces Sa and Sb of the first and second claw poles 44a and 44b. Each of the inter-pole cover segments 58 also has a predetermined constant curvature that enables corresponding pole cover segments 56, which are located circumferentially adjacent to the inter-pole cover segment 58 and joined to each other via the inter-pole cover segment 58, to be smoothly continued via the inter-pole cover segment 58.

Figure 4:
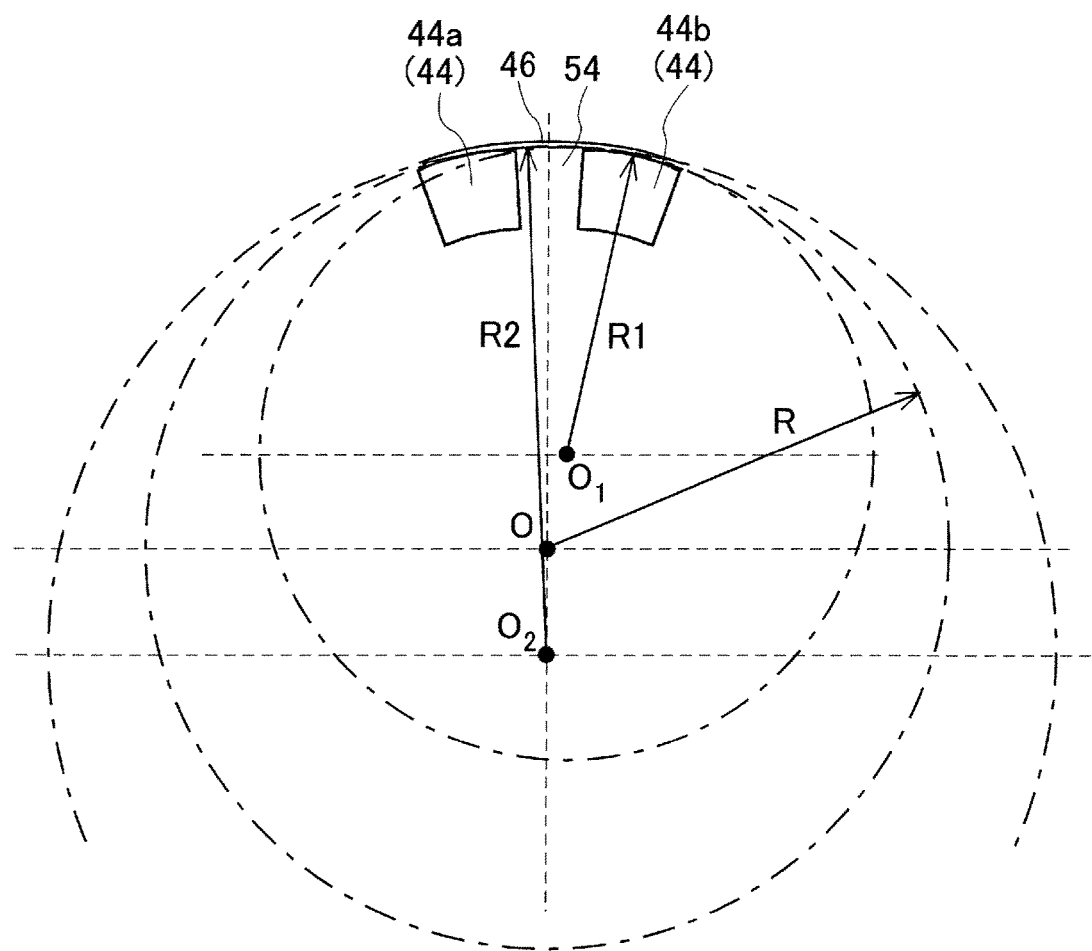
FIG. 4 is a view schematically illustrating a radius of curvature of each of first and second claw poles illustrated in FIG. 2.

As illustrated in FIGS. 4 and 5, each of the pole cover segments 56 of the annular cover member 46 has a center $O_1$, and each of the inter-pole cover segments 58 has a center $O_2$ different from the center $O_1$. The center $O_1$ of the circular arc of each of the pole cover segments 56 is located to be adjacent to the axial center O of the rotating shaft 50 and to be slightly closer to the corresponding claw pole than the axial center O thereto. The centers $O_1$ of the respective arc-shaped pole cover segments 56 are located to be different from one another.

Specifically, the circular-arc centers $O_1$ of all the pole cover segments 56 are equally distant from the axial center O of the rotating shaft 50. If a virtual line VL1 connecting between the middle of each of the circular-arced pole cover segments 56 and the axial center O of the rotating shaft 50 is defined, the virtual lines VL1 for the respective circular-arced pole cover segments 56 intersect with each other at the axial center O of the rotating shaft 50. The circular-arc centers O of all the pole cover segments 56 can be equal to each other and can match with the axial center O of the rotating shaft 50.

The center $O_2$ of the circular arc of each of the inter-pole cover segments 58 is located to be farther from the corresponding claw pole than the axial center O therefrom. The centers $O_2$ of the respective arc-shaped inter-pole cover segments 58 are located to be different from one another.

Specifically, the circular-arc centers $O_2$ of all the inter-pole cover segments 58 are equally distant from the axial center O of the rotating shaft 50. If a virtual line VL2 connecting between the middle of each of the circular-arced inter-pole cover segments 58 and the axial center O of the rotating shaft 50 is defined, the virtual lines VL2 for the respective circular-arced inter-pole cover segments 58 intersect with each other at the axial center O of the rotating shaft 50.

The pole cover segments 56 and the inter-pole cover segments 58, which respectively have different radii of curvature, are alternately joined to each other in the circumferential direction of the rotating shaft 50 around the axial center O of the rotating shaft 50. In other words, the inner cover surfaces 56a of the pole cover segments 56 and the inner cover surfaces 58a of the inter-pole cover segments 58, which respectively have the different radii of curvature, are alternately joined to each other in the circumferential direction of the rotating shaft 50 around the axial center O of the rotating shaft 50, resulting in the annular inner cover surface of the annular cover member 46 to be achieved.

That is, each of the pole cover segments 56 of the annular cover member 46 has the radius R1 of curvature that is identical to the radius R1 of curvature of the corresponding first or second claw pole 44a or 44b, and each of the inter-pole cover segments 58 has a radius R2 of curvature different from the radius R1 of curvature.

The curvature of each of the pole cover segments 56 is set to be larger than the curvature of each of the inter-pole cover segments 58, and the radius R1 of curvature of each of the pole cover segments 56 is set to be shorter than the radius R2 of curvature of each of the inter-pole cover segments 58. This relationship can be defined by the equation: R1<R2.

More specifically, the radius of curvature and curvature of the inner cover surface 56b of each pole cover segment 56 can be defined as the respective radius of curvature and curvature of the corresponding pole cover segment 56. The radius of curvature and curvature of the outer cover surface 56a of each pole cover segment 56 can be defined as the respective radius of curvature and curvature of the corresponding pole cover segment 56 if the corresponding pole cover segment 56 has a constant radial thickness thereacross. The radius of curvature and curvature of the intermediate line of each pole cover segment 56 between their outer and inner cover surfaces 56a and 56b cart be defined as the respective radius of curvature and curvature of the corresponding pole cover segment 56.

Similarly, the radius of curvature and curvature of the inner cover surface 58b of each inter-pole cover segment 58 can be defined as the respective radius of curvature and curvature of the corresponding inter-pole cover segment 58. The radius of curvature and curvature of the outer cover surface 58a of each inter-pole cover segment 58 can be defined as the respective radius of curvature and curvature of the corresponding inter-pole cover segment 58 if the corresponding inter-pole cover segment 58 has a constant radial thickness thereacross. The radius of curvature and curvature of the intermediate line of each inter-pole cover segment 58 between their outer and inner cover surfaces 58a and 58b can be defined as the respective radius of curvature and curvature of the corresponding inter-pole cover segment 58.

Referring to FIG. 6, each of the pole cover segments 56 has different circumferential widths, i.e. lengths, across the axial direction of the rotating shaft 50. Not that the pole cover segments 56 that face the respective first claw poles 44a will also be referred to as pole cover segments 56X, and the pole cover segments 56 that face the respective second claw poles 44b will also be referred to as pole cover segments 56Y.

Specifically, each of the pole cover segments 56X is tapered in the first axial direction of the rotating shaft 50 so as to be consistent with the corresponding first claw pole 44a. Similarly, each of the pole cover segments 56Y is tapered in the second axial direction so as to be consistent with the corresponding second claw pole 44b.

If each of the pole cover segments 56X has a base end and a tip end facing the respective base end and tip end of the corresponding first claw pole 44a, the circumferential width of each of the pole cover segments 56X is tapered from the base end to the tip end. Similarly, if each of the pole cover segments 56Y has a base end and a tip end facing the respective base end and tip end of the corresponding second claw pole 44b, the circumferential width of each of the pole cover segments 56Y is tapered from the base end to the tip end.

Figure 7:
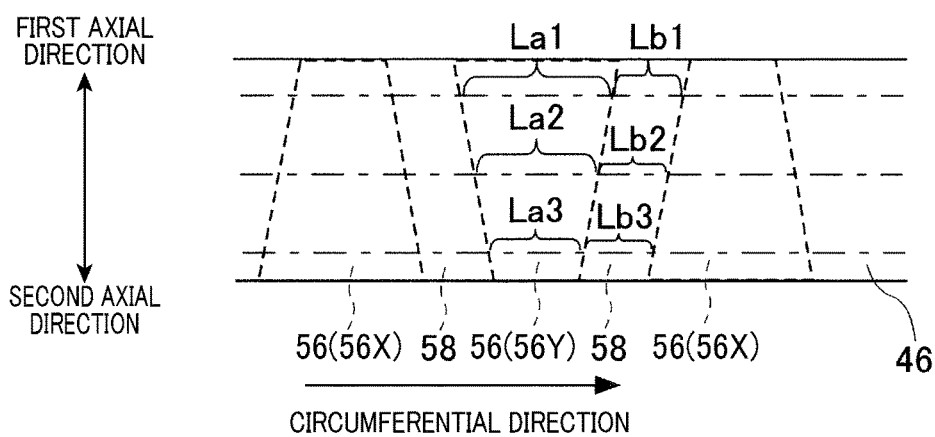
FIG. 7 is an enlarged view schematically illustrating a part of the annular cover member from the radial outside of the rotor.

For example, as illustrated in FIG. 7, assuming that the circumferential width (length) of each pole cover segment 56Y varies as values La1, La2, and La3 from the base end to the tip end, the values La1, La2, and La3 satisfy the following equation:

$$La1 > La2 > La3$$

Each pole cover segment 56X can similarly achieve this feature.

In addition, as illustrated in FIG. 6, each of the inter-pole cover segments 58 has a substantially constant circumferential width, i.e. length, across the axial direction of the rotating shaft 50 so as to be consistent with the corresponding pole gap 54.

For example, as illustrated in FIG. 7, assuming that each inter-pole cover segment 58 has values Lb1, Lb2, and Lb3 in the second axial direction of the rotating shaft 50, the values Lb1, Lb2, and Lb3 satisfy the following equation:

$$Lb1 \approx Lb2 \approx Lb3$$

If any position in the annular cover member 46 in the axial direction of the rotating shaft 50 is defined as a variable (z) and the circumferential width of each of the pole cover segments 56 is referred to as La, the circumferential width La of each of the pole cover segments 56 at any position of the corresponding pole cover segment 56 in the axial direction of the rotating shaft 50 can be expressed as La(z).

Similarly, if the circumferential width of each of the inter-pole cover segments 58 is referred to as Lb, the circumferential width Lb of each of the inter-pole cover segments 58 at any position of the corresponding inter-pole cover segment 58 in the axial direction of the rotating shaft 50 can be expressed as Lb(z).

At that time, the annular cover member 46 is configured such that the sum of all the circumferential widths La(z) and all the circumferential widths Lb(z) at any position (z) of the annular cover member 46 in the axial direction of the rotating shaft 50 is set to be a substantially constant value.

That is, the whole circumferential length of the annular cover member 46 through any position (z) of the annular cover member 46 in the axial direction of the rotating shaft 50 is set to be a constant value.

As described above, the circular-arc center $O_1$ of each pole cover segment 56 and the circular-arc center $O_2$ of each inter-pole cover segment 58 in the above-configured annular cover member 46 are located to be different from one another. In addition, the ratio La(z)/Lb(z) of the circumferential width La(z) of any pole cover segment 56 to the circumferential width Lb(z) of an adjacent inter-pole segment 58 varies depending on the variations of the variable (z).

Specifically, the closer the value of the variable (z) is to the value corresponding to the base end of any pole cover segment 56 in the axial direction of the rotating shaft 50, the larger the ratio La(z)/Lb(z) of the circumferential width La(z) of the pole cover segment 56 to the circumferential width Lb(z) of an adjacent inter-pole segment 58 is. Similarly, the closer the value of the variable (z) is to the value corresponding to the tip end of any pole cover segment 56 in the axial direction of the rotating shaft 50, the smaller the ratio La(z)/Lb(z) of the circumferential width La(z) of the pole cover segment 56 to the circumferential width Lb(z) of an adjacent inter-pole segment 58 is.

That is, the annular cover member 46 has a three-dimensional configuration that includes the following first and second features:

(1) The first feature is that the pole cover segments 56, which have the respective circular-arc centers $O_1$, and the inter-pole cover segments 58, which have the respective circular-arc centers $O_2$ different from the circular-arc centers $O_1$, are alternately arranged while they are continued in the circumferential direction of the rotor 20 around the axial center O of the rotating shaft 50

(2) The second feature is that the ratio La(z)/Lb(z) of the circumferential width La(z) of any pole cover segment 56 to the circumferential width Lb(z) of an adjacent inter-pole segment 58 varies depending on the variations of the variable (z) indicative of any position of the annular cover member 46 in the axial direction of the rotating shaft 50. The ratio La(z)/Lb(z) will also be referred to as a pole-gap cover ratio.

The first feature of the annular cover member 46 enables the waveform of the primary vibration mode originated from each of the pole cover segments 56 to be different from the waveform of the primary vibration mode originated from each of the inter-pole cover segments 58.

This enables the temporal waveform of the primary vibration mode originated from the annular cover member 46 to be a non-sinusoidal waveform. The non-sinusoidal waveform is comprised of the waveforms of the primary vibration mode originated from all the pole cover segments 56 and the waveforms of the primary vibration mode originated from all the inter-pole cover segments 58. This results in the non-sinusoidal temporal waveform of the primary vibration mode originated from the annular cover member 46 being clearly different from a simply sinusoidal temporal waveform of the primary vibration mode originated from a comparative annular cover member that has a uniformly annular circumferential outer surface having a single constant center.

Additionally, the second feature of the annular cover member 46 enables the waveforms of the primary vibration modes originated from the individual positions of each pole cover segment 56 in the axial direction of the rotating shaft 50 to be different from one another.

This enables the temporal waveform of the primary vibration mode, especially circumferential vibration mode, originated from the annular cover member 46 to be a non-sinusoidal waveform; the non-sinusoidal waveform is comprised of the different waveforms of the primary vibration modes originated from the individual positions of each pole cover segment 56 in the axial direction of the rotating shaft 50. This results in the non-sinusoidal temporal waveform of the primary vibration mode originated from the annular cover member 46 being clearly different from a simply sinusoidal temporal waveform of the primary vibration mode originated from a comparative annular cover member that has a constant value of the pole-gap cover ratio at any position thereof in the axial direction of the corresponding rotating shaft.

The aforementioned specific characteristics of the annular cover member 46 enables the vibration amplitude of the rotor 20 mainly in the circumferential direction of the claw pole assembly 44 to be reduced even if there are fluctuations in rotation of the engine and/or external magnetic exciting force is applied to the rotor 20 from the stator 24. This results in efficient reduction of vibration noise generated by the claw pole assembly 44 even if there are fluctuations in rotation of the engine and/or external magnetic exciting force is applied to the rotor 20 from the stator 24.

In addition, the radius of curvature R1 of each of the pole cover segments 56 of the annular cover member 46 is set to be different from the radius R2 of curvature of each of the inter-pole cover segments 58. In particular, the radius of curvature R1 of each of the pole cover segments 56 of the annular cover member 46 is set to be shorter than the radius R2 of curvature of each of the inter-pole cover segments 58.

The annular cover member 46 is configured such that the pole cover segments 56, each of which has the radius R1 of curvature, and the inter-pole cover segments 58, each of which has the radius R2 of curvature different from the radius R1 of curvature, are alternately arranged while they are continued in the circumferential direction of the rotor 20 around the axial center O of the rotating shaft 50

This configuration results in each of the pole cover segments 56 having a first vibrational eigenvalue and each of the inter-pole cover segments 58 having a second vibrational eigenvalue, so that the waveform of the primary vibration mode originated from each pole cover segment 56 is different from the waveform of the primary vibration mode originated from each inter-pole cover segment 58.

Figure 8:
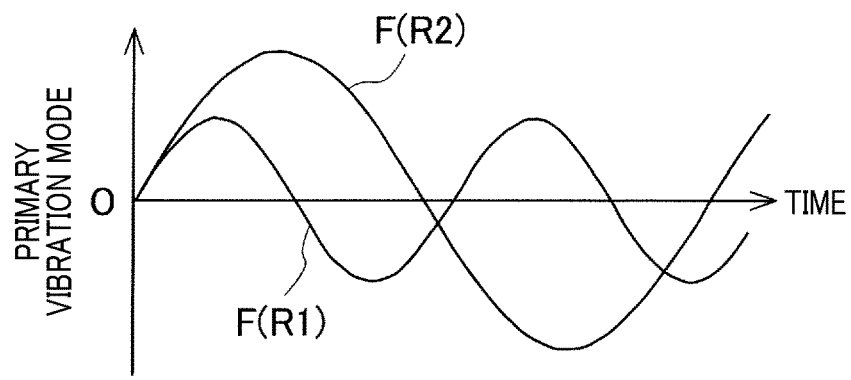
FIG. 8 is a graph schematically illustrating an example of the temporal waveform of a primary vibration mode originated from each pole cover segment, and an example of the temporal waveform of the primary vibration mode originated from each inter-pole cover segment.

FIG. 8 schematically illustrates an example of the temporal waveform F(R1) of the primary vibration mode originated from each pole cover segment 56, and an example of the temporal waveform F(R2) of the primary vibration mode originated from each inter-pole cover segment 58.

Figure 9:
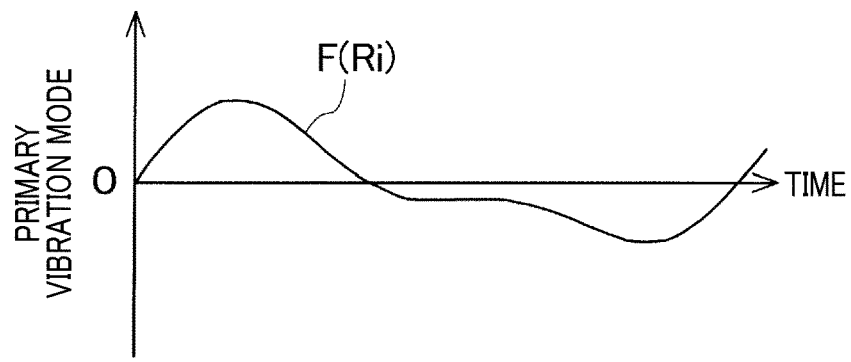
FIG. 9 is a graph schematically illustrating an example of the temporal waveform of the primary vibration mode originated from the annular cover member; the temporal waveform is comprised of the temporal waveform of the primary vibration mode originated from each pole cover segment and the temporal waveform of the primary vibration mode originated from each inter-pole cover segment.

Interaction of the temporal waveform F(R1) of the primary vibration mode originated from each pole cover segment 56 and the temporal waveform F(R2) of the primary vibration mode originated from each inter-pole cover segment 58 enables the temporal waveform of the primary vibration mode originated from the annular cover member 46 to be a non-sinusoidal waveform F(Ri). The non-sinusoidal waveform F(Ri) has, for example, an averaged combination of the temporal waveforms F(R1) of the primary vibration mode originated from all the pole cover segments 56 and the temporal waveforms F(R2) of the primary vibration mode originated from all the inter-pole cover segments 58 (see FIG. 9).

This results in the non-sinusoidal temporal waveform F(Ri) of the primary vibration mode originated from the annular cover member 46 being clearly different from a simply sinusoidal temporal waveform of the primary vibration mode originated from a comparative annular cover member that has a uniformly annular circumferential outer surface having a constant radius of curvature.

In particular, the non-sinusoidal temporal waveform F(Ri) of the primary vibration mode originated from the annular cover member 46 is smaller in both amplitude and period than the temporal waveforms F(R2) of the primary vibration mode originated from all the inter-pole cover segments 58.

This enables the vibration amplitude of the rotor 20 mainly in the circumferential direction of the claw pole assembly 44 to be reduced even if there are fluctuations in rotation of the engine and/or external magnetic exciting force is applied to the rotor 20 from the stator 24. This results in further efficient reduction of vibration noise generated by the claw pole assembly 44 even if there are fluctuations in rotation of the engine and/or external magnetic exciting force is applied to the rotor 20 from the stator 24.

Each of the first claw poles 44*a* is configured such that the corresponding circumferential width is gradually tapered from its base end to its tip end in the first axial direction of the rotating shaft 50, and each of the second claw poles 44*b* is configured such that the corresponding circumferential width is gradually tapered from its base end to its tip end in the second axial direction of the rotating shaft 50. In addition, each of the pole cover segments 56 is configured such that the circumferential length (width) La is gradually tapered from its base end facing the base end of the corresponding claw pole 44a or 44b to its tip end facing the tip end of the corresponding claw pole 44a or 44b.

The base end of each of the first and second claw poles 44a and 44b is continuously joined to the corresponding one of the support portions 42a and 42b.

This tapered configuration of each of the first and second claw poles 44a and 44b and each of the pole cover segments 56 enables fluctuations in the magnetic flux, which is generated by the rotating rotor 20 and acts on the stator 24, to be reduced, thus reducing magnetic noise due to the fluctuations in the magnetic flux.

This tapered configuration of each of the first and second claw poles 44a and 44b also enables the vibration amplitude of the rotor 20 mainly in the circumferential direction of the claw pole assembly 44 to be reduced as compared with both (1) The configuration where the circumferential width of each of the first and second claw poles 44a and 44b in the axial direction of the rotating shaft 50 is set to be constant (2) The configuration where the circumferential width of each of the first and second claw poles 44a and 44b is tapered from its tip end to its base end.

The above configuration of the rotor 20 therefore reduces the amplitude of vibrations of the first and second claw poles 44a and 44b due to centrifugal force applied to the claw poles 44a and 44b and/or external exciting force applied thereto. This makes it possible for the air gap between the rotor 20 and the stator 24 to have a sufficient margin against the vibrations of the first and second claw poles 44a and 44b. Alternately, this makes it possible to reduce the air gap between the rotor 20 and the stator 24.

In addition, the annular cover member 46 has a constant radial thickness over its entire circumference. In other words, the annular cover member 46 has no dents, each of which is a radially thinner portion of part of the annual cover member 46. If the annular cover member 46 had such a dent between an adjacent pair of first and second claw poles 44a and 44b, the annular cover member 46 would have a partially thin bridge shape between the adjacent pair of first and second claw poles 44a and 44b. This would prevent magnetic leakage from the permanent magnet 49 disposed between the adjacent pair of first and second claw poles 44a and 44b, but result in the dented portion of the annular cover member 46 decreasing in strength due to stress concentration.

From this viewpoint, the annular cover member 46, which has a uniform radial thickness over its entire circumference, enables the stress concentration factor at any point on the annular cover member 46 to be minimized. This prevents the annular cover member 46 from decreasing in strength due to stress concentration.

The above configuration of the rotor 20, which reduces the vibration level of the first and second claw poles 44a and 44b, enables the radial thickness of the annular cover member 46 to be reduced as thin as possible on condition that sufficient strength of the rotor 20 against such vibration is maintained.

The annular cover member 46 has a sufficiently thin and uniform radial thickness over its entire circumference as described above. This results in the annular cover member 46 being magnetically saturated if little magnetic flux is applied to the annular cover member 46. This causes the magnetic characteristics of the annular cover member 46 to become substantially equivalent to the magnetic characteristics of the air.

From this viewpoint, the rotor 20 is configured such that the arrangement of each adjacent pair of first and second claw poles 44a and 44b permit a certain amount of magnetic flux to be leaked through the space between the first and second claw poles 44a and 44b of each adjacent pair. This results in the space between the first and second claw poles 44a and 44b of each adjacent pair being magnetically saturated, thus providing a robust magnetic path across the space between the first and second claw poles 44a and 44b of each adjacent pair against magnetic leakage. The rotor 20 of this embodiment therefore achieves improvement of both mechanical strength and magnetic performance thereof.

In addition, the annular cover member 46 is made of a soft magnetic material. This makes it possible to ensure sufficient magnetic performance of the rotor 20, reduce electrical power required to energize the field winding 48, and ensure the controllability of the amount of magnetic flux generated by the rotor 20.

In particular, the annular cover member 46 is comprised of a plurality of soft magnetic annular thin plates stacked in their axial directions. This configuration enables eddy current loss in the annular cover member 46 in the axial direction of the rotating shaft 50 to be reduced, thus improving the energy efficiency of the rotor 20. The annular cover member 46 can include insulating layers 46a mounted on the major surfaces of each of the soft magnetic thin plates or each mounted between a corresponding adjacent pair of the soft magnetic thin plates. This further reduces eddy current loss in the modified annular cover member 46, thus further improving the energy efficiency of the rotor 20.

The annular cover member 46 has a smoothly curved annular inner surface that covers the pole gaps 54 between the first claw poles 44a and the second claw poles 44b. This reduces the harmonic components of the magnetic flux due to the slots of the stator 24. The harmonic components of the magnetic flux are $s \times n \pm 1$ order harmonic components where s represents the number of slots per pole of the rotary electric machine 22, and n represents an integer equal to or more than 1. That is, this configuration results in the harmonic components serving as a magnetic vibration source.

The rotor 20 including the above-described annular cover member 46 includes smoother outer circumferential surface of the rotor 20 as compared with a rotor without such an annular cover member. This results in a lower level of wind noise occurring when the rotor 20 is rotating as compared with a level of wind noise occurring when a rotor without such an annular cover member is rotating.

The rotor 20 according to this embodiment is configured such that the annular cover member 46 binds the first and second claw poles 44a and 44b arranged in the circumferential direction of the rotor 20. This configuration reduces the deformation, especially the radial deformation, of each of the first and second claw poles 44a and 44b.

In particular, each of the permanent magnets 49 is placed between a corresponding adjacent pair of first and second claw poles 44a and 44b, thus filling the corresponding pole gap 54. When the rotor 20 is rotating, centrifugal force is applied to the first and second claw poles 44a and 44b, so that radial deformation of the first and second claw poles 44a and 44b might increase.

The above-configured rotor 20 however prevents radial deformation of the first and second claw poles 44a and 44b from increasing even if centrifugal force is applied to the first and second claw poles 44a and 44b when the rotor 20 is rotating.

Additionally, the annular cover member 46 is configured such that the sum of all the circumferential widths $La(z)$ and all the circumferential widths $Lb(z)$ at any position $(z)$ of the annular cover member 46 in the axial direction of the rotating shaft 50 is set to be a substantially constant value.

That is, the whole circumferential length of the annular cover member 46 through any position (z) of the annular cover member 46 in the axial direction of the rotating shaft 50 is set to be a constant value.

This configuration uniformizes the fitting allowance of the annular cover member 46 in its axial direction; the fitting allowance is required for the annular cover member 46 to be fitted around the first and second claw poles 44a and 44b. This enables the annular cover member 46 to be reliably fixed to the claw pole assembly 44.

As described above, the rotor 20 for the rotary electric machine 22 according to this embodiment includes a claw pole assembly 44 including a plurality of first claw poles 44a and a plurality of second claw poles 44b. The first claw poles 44a have a first magnetic polarity, and the second claw poles 44b have a second magnetic polarity different from the first magnetic polarity. The first claw poles 44a and the second claw poles 44b are alternately arranged in a circumferential direction of the rotor 20 with gaps 54 therebetween. Each of the first and second claw poles 44a and 44b has an outer circumferential surface.

The rotor 20 also includes the annular cover member 46 that covers the first and second claw poles 44a and 44b.

The rotor 20 includes the field winding 48 and the permanent magnets 49 as a magnetomotive source, and a magnetic path means, i.e. a guiding means, for guiding therethrough magnetic flux generated by the magnetomotive source to the first and second claw poles 44a and 44b.

The annular cover member 46 includes the pole cover segments 56 each having a first circular-arc shape, and the inter-pole cover segments 58 each having a second circular-arc shape, alternately arranged in the circumferential direction of the rotor 20.

The ratio La(z)/Lb(z) of the circumferential width La(z) of any pole cover segment 56 to the circumferential width Lb(z) of an adjacent inter-pole segment 58 varies depending on the variable (z) representing any position in the annular cover member 46 in the axial direction of the rotor 20.

This configuration of the rotor 20 enables the temporal waveform of the primary vibration mode originated from the annular cover member 46 to be a non-sinusoidal waveform; the non-sinusoidal waveform includes (1) The waveforms of the primary vibration mode originated from all the pole cover segments 56

(2) The waveforms of the primary vibration mode originated from all the inter-pole cover segments 58

(3) The different waveforms of the primary vibration modes originated from the individual positions of each pole cover segment 56 in the axial direction of the rotating shaft 50.

This results in the vibration amplitude of each of the first and second claw poles 44a and 44b in the primary vibration mode decreasing, thus efficiently reducing vibration noise originated from the first and second claw poles 44a and 44b.

Each of the first claw poles 44a is configured to be gradually tapered from its base end to its tip end in the first axial direction of the rotating shaft 50, and each of the second claw poles 44b is configured to be gradually tapered from its base end to its tip end in the second axial direction of the rotating shaft 50. Each of the pole cover segments 56 is also configured such that the circumferential length (width) La is gradually tapered from its base end facing the base end of the corresponding claw pole 44a or 44b to its tip end facing the tip end of the corresponding claw pole 44a or 44b.

This tapered configuration of each of the first and second claw poles 44a and 44b and each of the pole cover segments 56 enables fluctuations in the magnetic flux, which is generated by the rotating rotor 20 and acts on the stator 24, to be reduced, thus reducing magnetic noise due to the fluctuations in the magnetic flux.

This tapered configuration of each of the first and second claw poles 44a and 44b also enables the vibration amplitude of the rotor 20 mainly in the circumferential direction of the claw pole assembly 44 to be reduced as compared with both (1) The configuration where the circumferential width of each of the first and second claw poles 44a and 44b in the axial direction of the rotating shaft 50 is set to be constant (2) The configuration where the circumferential width of each of the first and second claw poles 44a and 44b is tapered from its tip end to its base end.

The radius of curvature R1 of each of the circular-arced pole cover segments 56 of the annular cover member 46 in the rotor 20 is set to be different from the radius R2 of curvature of each of the circular-arced inter-pole cover segments 58.

This configuration of the rotor 20 enables the temporal waveform of the primary vibration mode originated from the annular cover member 46 to be a non-sinusoidal waveform; the non-sinusoidal waveform is comprised of (1) The waveforms of the primary vibration mode originated from all the pole cover segments 56

(2) The waveforms of the primary vibration mode originated from all the inter-pole cover segments 58

(3) The different waveforms of the primary vibration modes originated from the individual positions of each pole cover segment 56 in the axial direction of the rotating shaft 50.

This results in the vibration amplitude of each of the first and second claw poles 44a and 44b in the primary vibration mode decreasing, thus efficiently reducing vibration noise originated from the first and second claw poles 44a and 44b.

The annular cover member 46 is composed of an annular soft magnetic material that has a constant radial thickness over its entire circumference. This prevents the annular cover member 46 from decreasing in strength due to stress concentration. This also provides a robust magnetic path across the space between each adjacent pair of first and second claw poles 44a and 44b against magnetic leakage, thus achieving improvement of both mechanical strength and magnetic performance of the rotor 20.

The annular cover member 46 is comprised of a plurality of annular soft magnetic thin plates stacked in their axial directions. This configuration enables eddy current loss in the annular cover member 46 in the axial direction of the rotating shaft 50 to be reduced, thus improving the energy efficiency and torque-output efficiency of the rotor 20.

The annular cover member 46 according to this embodiment is comprised of a plurality of annular soft magnetic thin plates stacked in their axial directions. The present disclosure is however not limited to the configuration.

Figure 10:
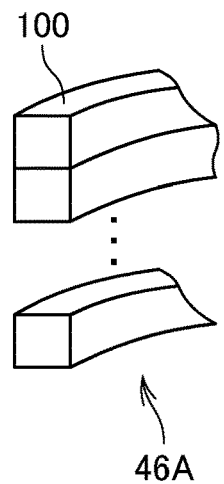
FIG. 10 is an enlarged view schematically illustrating a part of a modified annular cover member according to a first modification of the present embodiment.

For example, a modified annular cover member 46A can include a steel wire 100, which is an example of soft magnetic thin platy members and soft magnetic wires, spirally wound around the claw pole assembly 44 about the center axis of the rotor 20 (see FIG. 10). The annular cover member 46A can be configured such that spirally wound coils of the steel wire 100 are located to cover the outer circumferential surfaces of the first and second claw poles 44a and 44b while arranged in the axial direction of the rotor 20 with no gaps therebetween.

The annular cover member 46A enables eddy current loss in the modified annular cover member in the axial direction of the rotating shaft 50 to be reduced, thus improving energy efficiency and torque-output efficiency of the rotor 20. The annular cover member 46A also reduces waste materials in manufacturing the modified annular cover member as compared with the annular cover member 46 comprised of a plurality of soft magnetic annular thin plates stacked in their axial directions.

Because the steel wire 100 is spirally wound around the claw pole assembly 44 while being fixed to the claw pole assembly 44, it is possible to maintain the tension of the steel wire 100 constant during to the manufacturing process of winding the steel wire 100 around the claw pole assembly 44. This therefore achieves both the quality and productivity of the rotor 20. Note that thin plate members or a linear member, which has a substantially rectangular cross section as shown in FIG. 10, is used to constitute each of the annular cover member 46 and the annular cover member 46A. Thin plate members or a linear member, which has a substantially rectangular cross section with rounded corners or has a circular cross section, can be used to constitute each of the annular cover member 46 and the annular cover member 46A.

Figure 11:
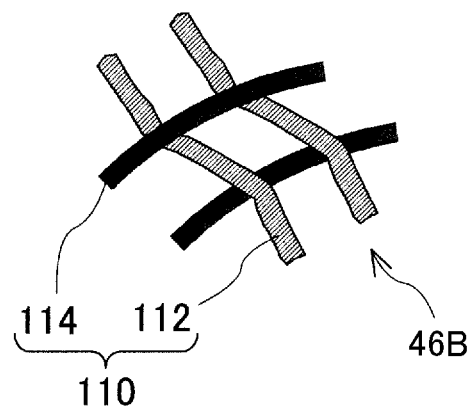
FIG. 11 is an enlarged view schematically illustrating a part of a modified annular cover member according to a second modification of the present embodiment.

For example, as illustrated in FIG. 11, a modified annular cover member 46B can be comprised of an annular soft-magnetic mesh member 110. The mesh member 110 includes vertical linear segments 112 each extending linearly along the axial direction of the rotor 20, and horizontal line segments 114 each extending linearly along the circumferential direction of the rotor 20.

The vertical linear segments 112, which are arranged in the circumferential direction of the rotor 20 with spaces therebetween, and the horizontal line members 114, which are arranged in the axial direction of the rotor 20 with spaces therebetween, can be woven to constitute the mesh member 110. The mesh member 110 need not be made up of the array of the linear segments, and can be made up of a non-woven fabric member.

The annular cover member 46B enables eddy current loss to be reduced therein, thus improving the output efficiency and energy efficiency of the rotary electric machine 22, and efficiently reducing fine vibrations of the first and second claw poles 44a and 44b. It is to be noted that the vertical linear segments 112 and the horizontal linear segments 114 constituting the annular cover member 146 are preferably separate segments from each other. Preferably, the vertical linear segments 112 extending along the axial direction of the rotor 20 are each made of a material with high magnetic performance in order to ensure the magnetic performance of the annular cover member 46. In addition, the horizontal line members 114 extending along the circumferential direction of the rotor 20 are preferably made of a material with high strength in order to ensure the strength of the annular cover member 46.

Figure 12:
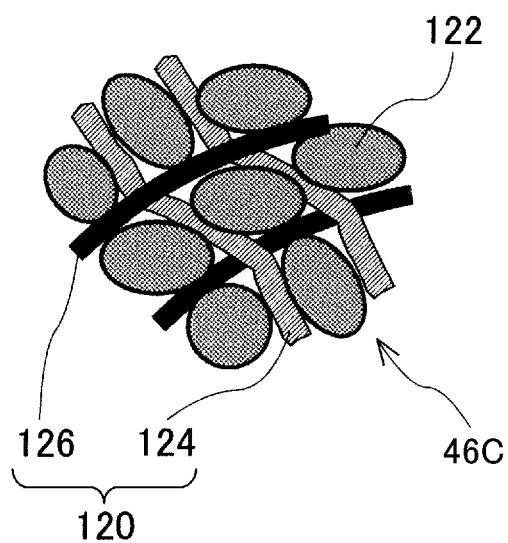
FIG. 12 is an enlarged view schematically illustrating a part of a modified annular cover member according to a third modification of the present embodiment.

For example, as shown in FIG. 12, a modified annular cover member 46C can be comprised of an annular soft magnetic mesh member 120 having mesh holes 120a therein. The annular cover member 46C includes magnetic materials 122 filled in the respective mesh holes 120a.

Similarly to the mesh member 110, the mesh member 120 includes vertical linear segments 122 each extending linearly along the axial direction of the rotor 20, and horizontal line segments 124 each extending linearly along the circumferential direction of the rotor 20.

The vertical linear segments 122, which are arranged in the circumferential direction of the rotor 20 with spaces therebetween, and the horizontal line members 124, which are arranged in the axial direction of the rotor 20 with spaces therebetween, can be woven to constitute the mesh member 120. Each of the magnetic materials 122 is, for example, a ferromagnetic material, such as iron. The magnetic materials are filled in the respective mesh holes 120a surrounded by the vertical line members 124 and horizontal members 126 of the mesh member 120.

The annular cover member 46C improves its magnetic performance as compared with an annular cover member without including magnetic materials. Each of the magnetic materials 122 preferably has electrical and magnetic properties similar to those of a powder core.

Figure 13:
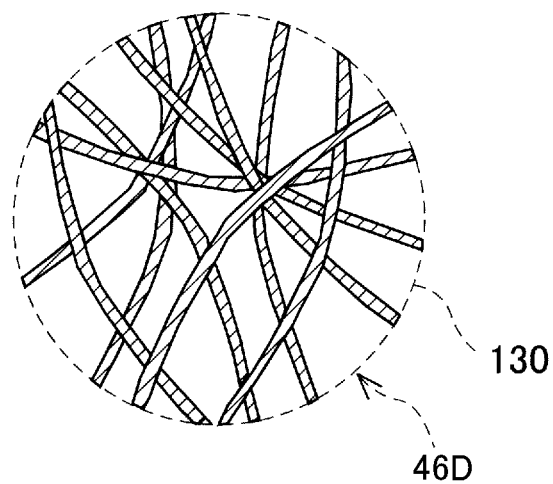
FIG. 13 is an enlarged view schematically illustrating a part of a modified annular cover member according to a fourth modification of the present embodiment.

As illustrated in FIG. 13, a modified annular cover member 46D can be comprised of an annular porous magnetic member 130. The porous magnetic member 130 is made of a ferromagnetic porous material, such as iron, having many small holes therein. The magnetic member 130 preferably has high resistance similar to the resistance of a powder core or other similar cores.

The annular cover member 46D enables eddy current loss to be reduced therein, and improves its magnetic performance.

Figure 14:
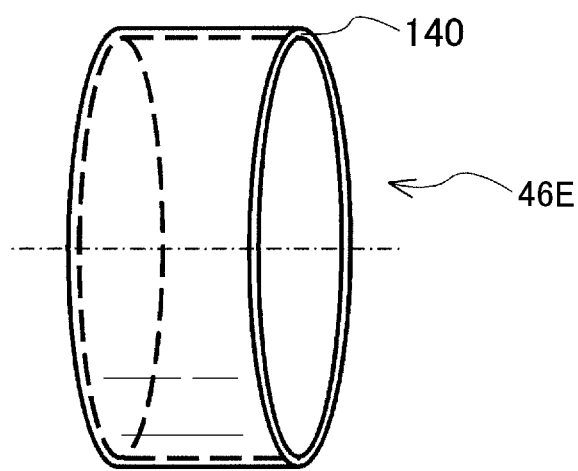
FIG. 14 is an enlarged view schematically illustrating a modified annular cover member according to a fifth modification of the present embodiment.

As illustrated in FIG. 14, a modified annular cover member 46E can be comprised of a hollow cylindrical pipe member 140 extending in the axial direction of the rotor 20. The pipe member 140 is a cylindrical tube having an entirely uniform structure. The pipe member 140 is made of a soft magnetic material with an electrical resistivity higher than the electrical resistivity of an electromagnetic soft iron (e.g., martensitic stainless steel, ferritic stainless steel, precipitation hardening stainless steel, etc.).

The rotor 20 is configured such that the claw pole assembly 44 is filled in the pipe member 140 serving as the annular cover member 46E.

The annular cover member 46E, which has high resistance, enables eddy current loss to be reduced therein, and satisfies sufficient magnetic performance because the pipe member 140 is made of a soft magnetic material. It is to be noted that the pipe member 140 can be made of any material that will have soft magnetic property when the pipe member 140 is mounted to surround the claw pole assembly 44 as the annular cover member 46E. For example, the pipe member 140 can be made of a material whose base material is non-magnetic but becomes a magnetic material after processing. For example, austenitic stainless steel comprising SUS304 can be used (but not SUS305) as a base material for the pipe member 140.

Each of the annular cover members 46 and 46A to 46E is comprised of the pole cover segments 56 having a circular-arc shape with a first constant curvature, and the inter-pole cover segments 58 having a circular-arc shape with a second constant curvature different from the first constant curvature. The present disclosure is however not limited to the configuration.

Specifically, each of the pole cover segments 56 can be comprised of a plurality of circular-arc members, which have respectively different curvatures, joined circumferentially. Similarly, each of the inter-pole cover segments 58 can be comprised of a plurality of circular-arc members, which have respectively different curvatures, joined circumferentially. The whole surface of each of the pole cover segments 56 can be shaped as an elliptic surface, and the whole surface of each of the inter-pole cover segments 56 can be shaped as an elliptic surface. The curvatures of the pole cover segments 56 are set to be different from the curvatures of the inter-pole cover segments 58.

The rotor 20 according to the above embodiment and modifications is comprised of both the field coil 48 and the permanent magnets 49 as a magnetomotive source. However, the present disclosure is not limited to the configuration. Specifically, the rotor 20 can include only one of the field coil 48 and the permanent magnets 49 as a magnetomotive source.

While the illustrative embodiment and modifications of the present disclosure have been described herein, the present disclosure is not limited to the embodiment and modifications described herein, but includes any and all embodiments having modifications, omissions, combinations (e.g., of aspects across various embodiments), adaptations and/or alternations as would be appreciated by those in the art based on the present disclosure. The limitations in the claims are to be interpreted broadly based on the language employed in the claims and not limited to examples described in the present specification or during the prosecution of the application, which examples are to be construed as non-exclusive.

What is claimed is:

1. A rotor for a rotary electric machine, comprising:
    a claw pole assembly including a plurality of first claw poles and a plurality of second claw poles, the first and second claw poles respectively having first and second magnetic polarities different from each other when magnetized, the first claw poles and the second claw poles being alternately arranged in a circumferential direction of the rotor with gaps therebetween, each of the first and second claw poles having an outer circumferential surface;
    a magnetomotive source including at least one of a field winding and a permanent magnet, the magnetomotive source being configured to generate magnetic flux;
    a guiding means for guiding therethrough the magnetic flux generated by the magnetomotive source to the first and second claw poles; and
    an annular cover member that covers the outer circumferential surfaces of the first and second claw poles, the annular cover member comprising:
    a plurality of pole cover segments abutting on the respective outer circumferential surfaces of the first and second claw poles; and
    a plurality of inter-pole cover segments facing the respective spaces between the first and second claw poles, wherein:
    each of the pole cover segments has a circular-arc shape around a first center, a first circumferential width, and a first radius of curvature relative to the first center;
    each of the inter-pole cover segments has a circular-arc shape around a second center different from the first center, a second circumferential width, and a second radius of curvature relative to the second center;
    the pole cover segments and the inter-pole cover segments are alternately arranged in the circumferential direction of the rotor;
    the first circumferential width of each pole cover segment and the second circumferential width of a corresponding one of the inter-pole segment adjacent to the pole cover segment has a predetermined ratio, the predetermined ratio varying in an axial direction of the rotor; and
    the first radius of curvature of each of the pole cover segments is different from the second radius of curvature of each of the inter-pole cover segments.

2. The rotor for a rotary electric machine according to claim 1, wherein:
    each of the first claw poles has a base end joined to the guiding means and a tip end opposite to the base end in the axial direction of the rotor;
    each of the second claw poles has a base end joined to the guiding means and a tip end opposite to the base end in the axial direction of the rotor;
    each of the first claw poles is configured to be gradually tapered from the base end to the tip end; and
    each of the second claw poles is configured to be gradually tapered from the base end to the tip end.

3. The rotor for a rotary electric machine according to claim 1, wherein:
    the first radius of curvature of each of the pole cover segments is set to be shorter than the second radius of curvature of each of the inter-pole cover segments.

4. The rotor for a rotary electric machine according to claim 1, wherein:
    the annular cover member is made of an annular soft magnetic material that has a constant radial thickness over an entire circumference thereof.

5. The rotor for a rotary electric machine according to claim 1, wherein:
    the annular cover member comprises a plurality of annular soft magnetic thin plates stacked in their axial directions.

6. The rotor for a rotary electric machine according to claim 1, wherein:
    the annular cover member comprises a coil spirally wound around the claw pole assembly about a center axis of the rotor, the coil being made of one of a soft magnetic thin platy member and a soft magnetic wire.

7. The rotor for a rotary electric machine according to claim 1, wherein:
    the annular cover member comprises an annular soft-magnetic mesh member.

8. The rotor for a rotary electric machine according to claim 1, wherein:
    the annular cover member comprises:
    an annular soft-magnetic mesh member having mesh holes therein; and
    magnetic materials filled in the respective mesh holes.

9. The rotor for a rotary electric machine according to claim 1, wherein:
    the annular cover member comprises an annular porous magnetic member.

10. The rotor for a rotary electric machine according to claim 1, wherein:
    the annular cover member comprises a hollow cylindrical soft-magnetic pipe member higher in electrical resistivity than a soft-magnetic iron.

* * * * *